Aug. 29, 1939.   C. S. LAWTON   2,171,156
SYSTEM AND APPARATUS FOR DETERMINING AT A DISTANCE
THE ANGULAR POSITION OF A SUBMARINE DEVICE
Filed Feb. 11, 1938   4 Sheets-Sheet 1
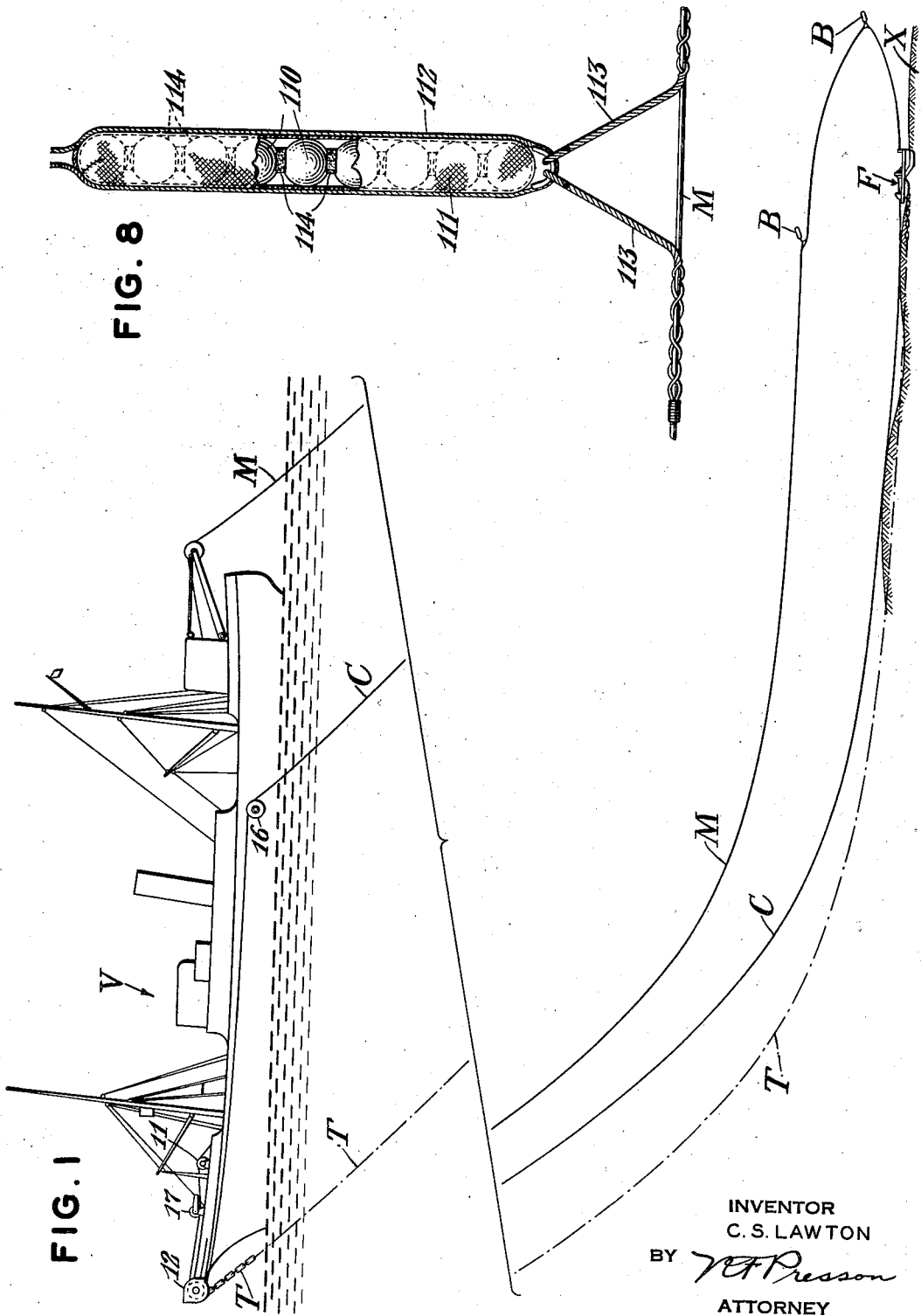
INVENTOR
C. S. LAWTON
BY
ATTORNEY Aug. 29, 1939.                C. S. LAWTON                    2,171,156
           SYSTEM AND APPARATUS FOR DETERMINING AT A DISTANCE
              THE ANGULAR POSITION OF A SUBMARINE DEVICE
                     Filed Feb. 11, 1938         4 Sheets-Sheet 2
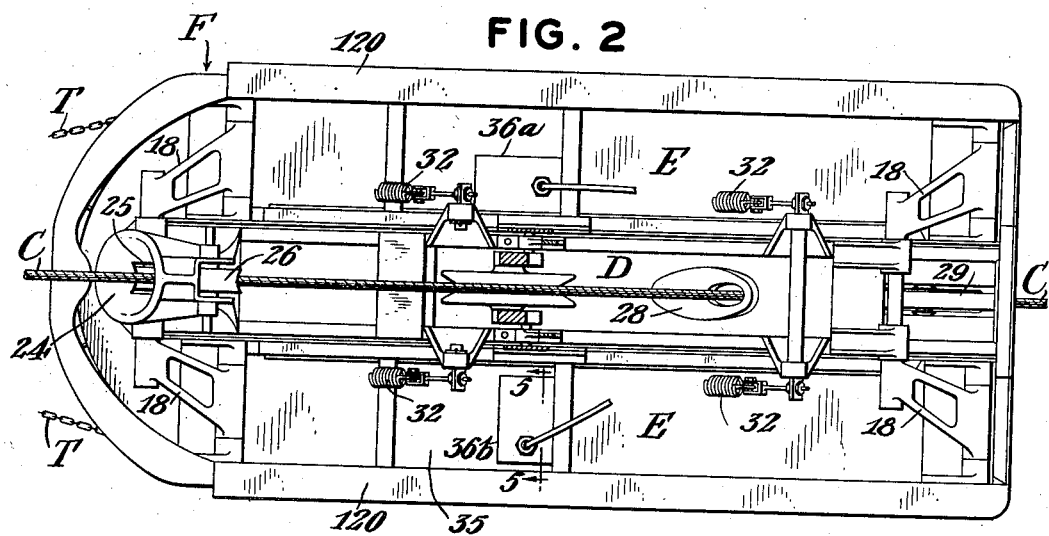
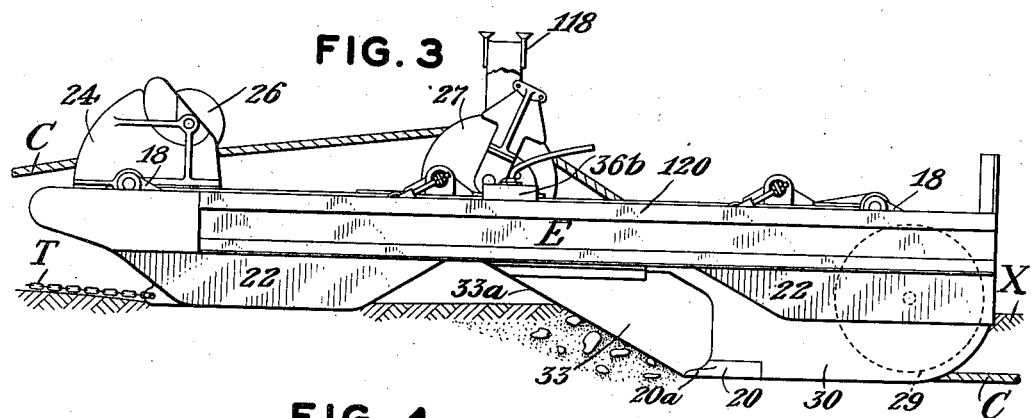
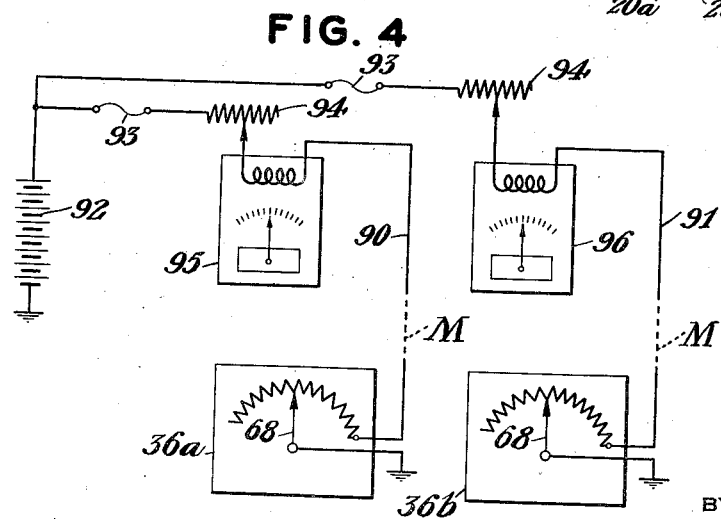
INVENTOR
C. S. LAWTON
BY N. F. Presson
ATTORNEY Aug. 29, 1939.     C. S. LAWTON     2,171,156
SYSTEM AND APPARATUS FOR DETERMINING AT A DISTANCE
THE ANGULAR POSITION OF A SUBMARINE DEVICE
Filed Feb. 11, 1938     4 Sheets-Sheet 3

INVENTOR
C. S. LAWTON
BY
ATTORNEY

Aug. 29, 1939.  C. S. LAWTON  2,171,156
SYSTEM AND APPARATUS FOR DETERMINING AT A DISTANCE
THE ANGULAR POSITION OF A SUBMARINE DEVICE
Filed Feb. 11, 1938  4 Sheets-Sheet 4

INVENTOR
C. S. LAWTON
BY
ATTORNEY

Patented Aug. 29, 1939

2,171,156

UNITED STATES PATENT OFFICE 2,171,156

SYSTEM AND APPARATUS FOR DETERMINING AT A DISTANCE THE ANGULAR POSITION OF A SUBMARINE DEVICE

Chester S. Lawton, Ridgewood, N. J., assignor to The Western Union Telegraph Company, New York, N. Y., a corporation of New York Application February 11, 1938, Serial No. 189,971

12 Claims. (Cl. 177—311)

This invention relates generally to a system and apparatus for determining at a distance the angular positions assumed by a submarine device as it travels along on the bed of the ocean or other body of water, and more particularly for determining at a point remote from a submarine cable laying device the position assumed at any instant by the device with respect to the horizontal during cable laying operations.

Submarine cables when laid on the bed of the ocean or other body of water through which they pass, frequently are fouled or dragged and sometimes are broken by otterboards of nets of deep sea fishing vessels or by ship's anchors and in the U. S. patent to Lawton and Bloomer, No. 2,067,717, issued January 12, 1937, and the U. S. patent to C. S. Lawton, Reissue No. 20,665, issued March 1, 1938, there are disclosed various forms of a submarine cable plow adapted to be towed by a cable ship for forming under water a trench in the bed of the body of water in which the cable is to lie and simultaneously placing the cable therein to embed the same and thus avoid fouling of, or injury to, the cable. It is highly desirable to know on board ship the angular position assumed at any instant by the cable plow axes (transverse and longitudinal) during the plowing operation, thereby to obtain an indication of the manner in which the plow is working and also to disclose the configuration or topography of the bed in which the cable is embedded and the rise and fall of the embedding device and the cable due to elevations and depressions in the ocean bed.

One of the objects of the invention is to provide a system and apparatus suitable for operation in water of varying depth, which will disclose on board ship, or at some other distant point, the position of the cable embedding device at any instant during the embedding operation.

Another object is transmitting apparatus adapted to be carried by the cable embedding device for automatically transmitting signals for indicating on board ship the position of the embedding device at all times during the plowing operation, which apparatus will operate equally well in shallow and deep water.

An additional object is the provision of suitable means for preventing fouling of certain of the cables during cable embedding operations.

A further object is a novel and improved system and apparatus for disclosing the topography of the bed of the ocean or other body of water.

The invention further resides in the features of combination, construction and arrangement hereinafter described and claimed.

For an understanding of the invention, and for illustration of one of the various forms it may take, reference is had to the accompanying drawings, in which:

Fig. 1 is a diagrammatic view of a cable ship and submarine cable plow embodying signal transmitting apparatus in accordance with the invention, during cable laying operations;

Fig. 2 is a plan view of the submarine cable plow and transmitting apparatus;

Fig. 3 is a side view, in elevation, of the apparatus of Fig. 2;

Fig. 4 is a schematic diagram of the signal circuit employed in Fig. 1;

Fig. 8 is a detail of certain buoys employed with the signal cable of the transmitting system.

Figure 5:
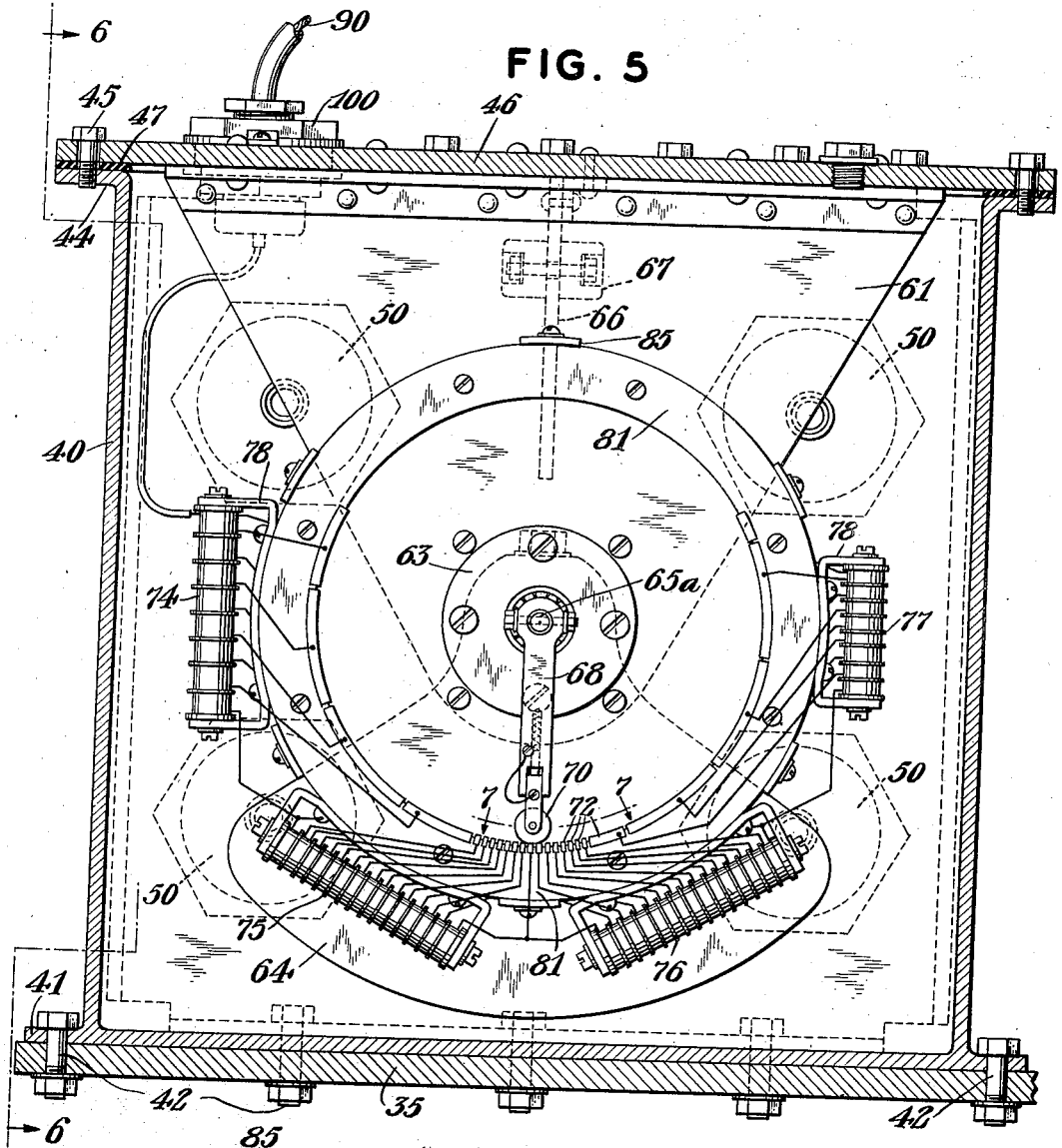
Fig. 5 is a sectional view, taken along the line 5—5 of Fig. 2, showing certain details of the transmitting apparatus.

Referring to Fig. 1 of the drawings, there is shown a cable embedding device F for forming a cable trench X in the bed of the body of water in which the cable C is to be embedded and simultaneously placing the cable in the trench. As will be seen from the figure, the cable embedding device is towed by a cable ship or vessel V, by means of a towline T, both the cable and towline forming long curves in the water, the amount of sag in the cable and towline varying with the depth of the water in which the embedding device is working. By employing a towline of proper length, the sag in the line causes the latter to exert a pull on the cable embedding device in a direction substantially parallel to the bed on which the embedding device is traveling. Preferably, the sag in the cable C is maintained such that the cable is approximately tangent to the bed at or near the point where it enters the embedding device. The cable is payed out from a cable supply in the hold of the vessel V, preferably in the manner disclosed in the aforesaid Lawton and Bloomer Patent No. 2,067,717, the cable passing through a suitable brake device which controls the slack condition of the cable as it passes to the cable payout drum 11. The cable winds around the drum several times and then passes to a roller or sheave 12 on the bow of the ship, after which it is passed along the side of the ship a suitable distance, for example, two-thirds the length of the ship, to a roller or sheave 16 on the side of the cable ship, thereby to minimize the possibility of fouling of the cable C with the towline T. The cable also passes through a dynamometer device 17 which measures the tensile strength on the cable as the latter is payed out. It will be understood that additional rollers or sheaves, not shown, are provided for supporting and guiding the cable on board ship, and also that additional cable sheaves may be provided on the side of the ship, if desired.

The stress on the towline T may be measured and controlled by a suitable dynamometer device similar to that employed in measuring the stress on the cable C, and the length of the towline between the bow of the vessel and the cable embedding device F may be adjusted to varying depths of water and conditions of towing in the manner disclosed in the aforesaid Lawton and Bloomer patent.

The cable embedding device may be of the type disclosed in the Lawton and Bloomer patent, but preferably is an accordance with the improved form of cable plow disclosed in the aforesaid Lawton Reissue Patent No. 20,665. Briefly, the latter device comprises two frame members or platforms, generally indicated at D and E, respectively, Figs. 2 and 3 herein, operatively connected together by forward and after link arms 18, which coact to cause a plow-share 20, Fig. 3, to form a cable trench X that varies in depth as the ground resistance of the bed varies, thereby to maintain the towline tension within predetermined limits and to cause the cable to be embedded to a greater depth in those areas of the ocean bed comprising soft material than in the areas comprising denser material. Preferably, and as shown, the plowshare has wing members 20a on either side thereof to facilitate displacing the material forming the bed sufficiently to enable the cable to be laid in the bottom of the resulting trench. Rigidly secured to the frame member E are runners or skids 22 by means of which the cable embedding device is slid along on the bottom of the ocean.

The frame member D carries a cable guide member 24 which permits the cable C easily to enter the guide and pass between the sheaves or rollers 25 and 26, over the roller 27, and through a trunkway 28, Fig. 2, the cable being forcibly laid in the bottom of the trench X by means of a sheave or cable guide roller 29, the cable passing between two side plates 30 in order that the material displaced by the plow will not slide or be washed back into the trench before the cable is laid therein. As set forth in detail in the aforesaid Lawton patent, the platform D in its lowermost position rests on the platform E, and retractile tension springs 32, operatively connected to the platforms, are provided to oppose their separation. The plowshare 20 is rigidly secured to and depends from the platform D which is vertically movable with respect to platform E. When the ground resistance offered to the passage of the plowshare 20 builds up, a couple is created with the towing tension, tending to separate the two platforms D and E vertically. This causes the upper platform D to rise to different heights depending upon the density of the material forming the bed, and this causes a corresponding rise in the plowshare 20 carried by the platform D, thus decreasing the depth of the trench X as the dense material is encountered and causing the trench to vary in depth inversely as the density of the material forming the surface of the bed of the body of water. Resisting the couple thus formed is the weight of the upper platform D and the tension exerted by the springs 32, and by proper design of the spring structure a balance can be obtained at any predetermined maximum towing tension at both extreme positions of the frames.

In order to prevent fouling of the plowshare 20 by obstructions, such as underlying rock formations and the like, which may be encountered in the ocean bed, a web portion 33, Fig. 3, is provided which extends between the plowshare and the platform D, the inclined forward edge 33a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Fixedly secured to the plate 35 of the platform E are two transmitting devices 36a and 36b, constructed in accordance with the present invention, these devices being operable under water and adapted to transmit signals corresponding to the successive angular positions assumed by the cable embedding device with respect to the horizontal as it travels along on the bed of the body of water. In the embodiment illustrated herein, electrical signals are produced by these devices and are transmitted, by means of a signal or messenger cable M, Fig. 1, to the cable ship, the ship having receiving apparatus thereon responsive to such signals for indicating and recording the angular position assumed at any instant by the submarine embedding device during the cable laying operations. The transmitting devices 36a and 36b, Fig. 2, respectively produce signals in accordance with the longitudinal and transverse positions of the cable plow with respect to the horizontal, i. e., the angular positions of the cable embedding device, during the entire plowing operation.

Figure 7:
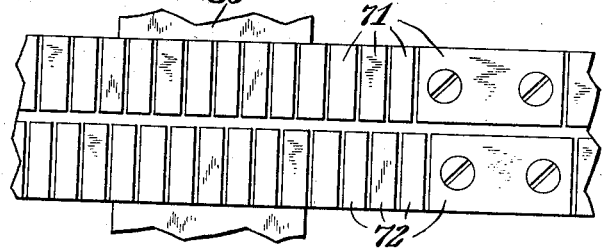
Fig. 7 is a fragmentary sectional view taken along the line 7—7 of Fig. 5.
Figure 6:
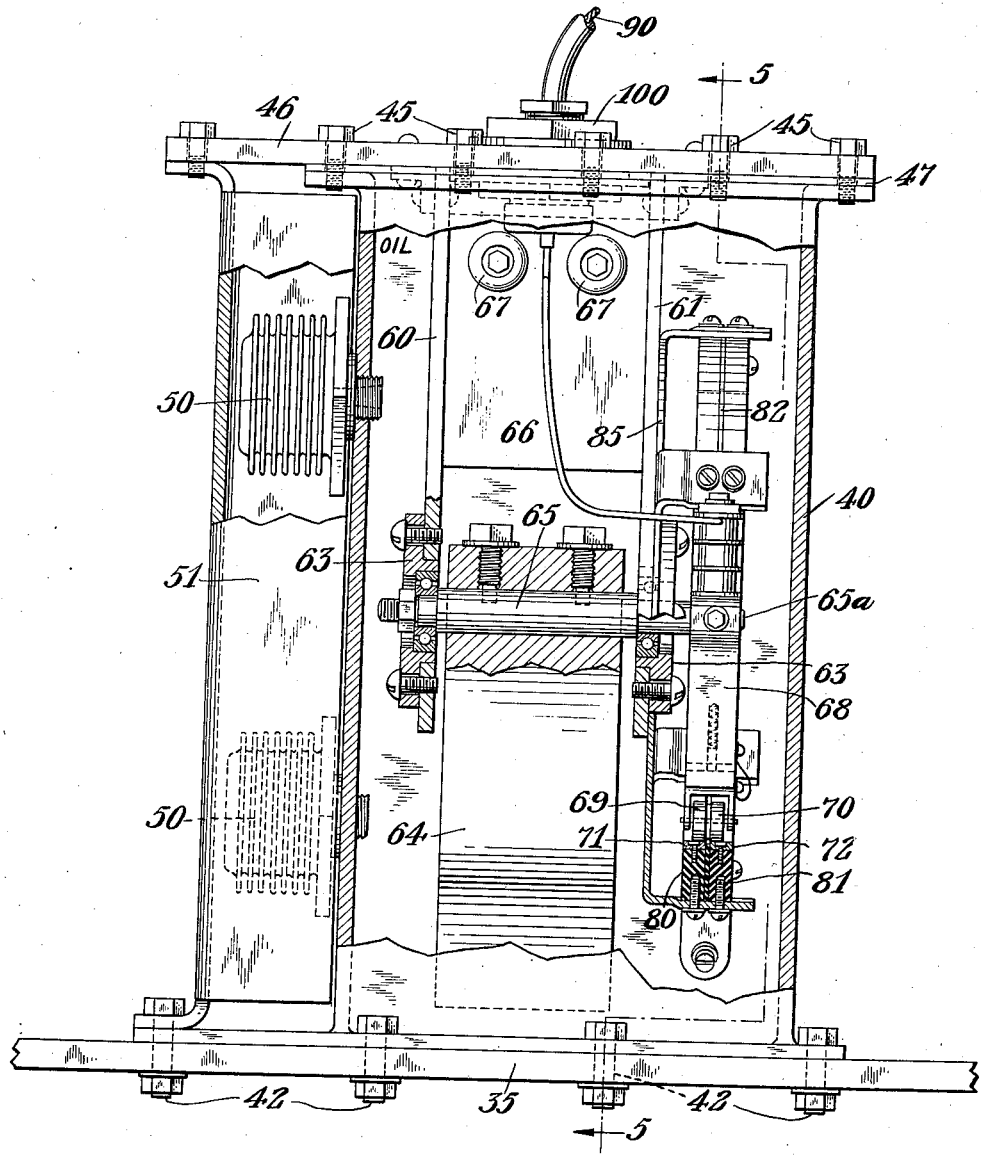
Fig. 6 is a sectional view taken along the line 6—6 of Fig. 5.

Figs. 5 to 7 illustrate the various details of a preferred form of transmitting device which may represent either of the devices 36a and 36b, although it will be understood that any other form of transmitting device suitable for the purpose may be employed. In the embodiment illustrated, the transmitter is enclosed in a casing 40 which is filled with oil, preferably castor oil of low acid content. The casing has a lower flanged portion 41 for receiving bolts 42 by means of which the transmitter casing is secured to the plate 35 of the platform E of the embedding device. The casing is also provided with an upper flanged portion 44 for receiving bolts 45 which clamp a detachable cover plate 46 on the casing, a gasket 47 of vulcanized rubber or other suitable material being provided to prevent escape of the oil from the casing.

Because of the enormous hydrostatic pressures encountered in deep sea operations, the casing for each transmitter must be able to withstand very high pressures. The use of a very heavy container having the proper configuration, for example, cylindrical or spherical, does not provide a practical solution where a cable or conductor, such as the signal cable M, enters the casing, since the hydrostatic pressure of the water tends to cause the casing to leak at the gland and packing around the conductor. Furthermore, the use of a very heavy casing is undesirable because of the considerable additional weight of such casings, and also because the configuration of such casings usually results in considerable lost space between the enclosed apparatus and the casing.

In the form of casing illustrated herein, however, four metal bellows members 50 are employed, these members having their inner open ends screwed into the body of the casing 40 from the outside, the outer bellows portions projecting from a side of the casing, as shown in Fig. 6. The bellows are protected by a false side 51 of steel plate, the plate being fitted to the container with sufficient clearance to permit the water to reach the bellows. The casing and bellows are filled with the castor oil above mentioned and as the hydrostatic pressure of the water is applied to the bellows the latter are compressed to an extent such that the pressure on the oil within the casing, due to the compression of the bellows, increases until it substantially equalizes the hydrostatic pressure of the water. In a submarine device such as illustrated herein, the bellows are so constructed that at a depth of 500 fathoms in sea water all bellows members will be compressed about three-quarters of the maximum permissable amount. When filling the casing with oil, it is necessary to take precautions against leaving air pockets. By means of this equalization of pressure within and without the casing, the latter may be made of relatively thin, lightweight material, and may have any desired configuration, this feature comprising the subject-matter of a separate invention described and claimed in my copending application for "Submarine apparatus", Serial No. 189,972, filed of even date herewith.

Fixedly secured to and depending from the cover plate 46 of the casing 40 are two triangular shaped plates 60 and 61, having ballbearings 63 at their lower ends. A pendulum 64, capable of swinging in one plane only, is suspended from a freely rotatable shaft 65 mounted in the bearings 63 in the plate members 60 and 61. The arc through which the pendulm may swing in either direction from the vertical, or zero position, is limited by a stop plate 66 disposed intermediate, and at right angles to, the plates 60 and 61. Suitable stops 67 of rubber or other suitable material are mounted in the stop plate to engage the pendulum 64 and stop the same in either extreme position of its swing without injury thereto. The oil in the casing provides a suitable damping means for making the pendulum substantially dead beat, which feature is controllable within certain limits by varying the viscosity of the oil.

A reduced portion 65a of the shaft 65 extends through the plate 61, and bolted thereto is the inner end of a rheostat arm 68, the arm carrying at its outer end phosphor-bronze spring-pressed rollers 69 and 70 adapted to travel over and electrically contact two rows of conducting segments 71 and 72, respectively, for connecting in circuit various sections of the tapped resistance coils 74, 75, 76 and 77. The rheostat segments are secured to the inner surfaces of two annular rings 80 and 81 of Bakelite or other suitable insulating material, these rings being clamped together with an insulating separator ring 82, the separator ring insuring proper spacing between the two rows of contacts 71 and 72. The resistance coils 74 to 77 are secured by brackets 78 to the outer surfaces of the annular rings, and the rings are suspended by a spider framework 85 secured to the plate 61. By means of this construction all working parts other than the bellows are suspended from the cover plate 46, and this maintains correct tracking of the rollers 69 and 70 of the rheostat arm on the rows of contacts at all times, and also facilitates inspection and repair of the various parts.

Any turning movement of the pendulum 64 about the axis of the shaft 65, caused by a change in the angular position of the submarine device as it travels along on the bed of the ocean, causes a corresponding movement of the rheostat arm 68 and the rollers 69 and 70 over the contact segments 71 and 72, and thus electrical impulses are introduced into the signal circuit 90 or 91, Fig. 4, for transmitting to the vessel V electrical signals corresponding to the angular positions assumed at any instant by the device, which signals produce on board ship a movement of an associated recording or indicating instrument, such as a recording milliammeter 95 or 96, the milliammeter indicating and also producing a record of the successive positions of the submarine device.

In the devices disclosed herein the particular design of the transmitter rheostat shown was chosen for the following reasons. It was necessary that the pendulum 64 register one-degree angular movements in the region of the zero position, shown on Fig. 5, and a stud type rheostat was desirable. The radius of the arc of contact had to be large for one-degree studs to be practicable; on the other hand, a large radius involves a high friction torque, a large heavy pendulum and a large casing. Step-up gearing between the rheostat arm and its actuating shaft was impracticable because of the effect which even a slight backlash and friction would have on the accuracy of the device. Since the normal pressure at the contact surfaces was to reach 1300 pounds per square inch, the coefficient of friction had to be as small as possible so that the desired accuracy could be obtained with a reasonable size of pendulum. In the rheostat herein disclosed, the contact is made by the rollers 69 and 70 which move over the two rows of segments 71 and 72. The smallest segments of each row (which are on each side of the zero position as shown in Fig. 5) subtend an angle of two degrees at the shaft axis, and one row of segments is displaced one degree with respect to the other, as shown in Fig. 7. The rollers 69 and 70 alternately make contact with the segments of the two rows, and the effect is that of segments on one-degree centers while the radius of the contact circle is only approximately four inches in the embodiment illustrated. Preferably, and as shown, each of the two pendulum transmitters is arranged to give readings in steps of one degree for fifteen degrees pendulum swing on either side of zero, but beyond this the rheostat segments and the corresponding milliammeter deflections are enlarged.

The two signaling circuits 90 and 91, shown diagrammatically on Fig. 4, are supplied from a 110 volt battery or other source of direct current 92 on board ship, one side of the battery being grounded to the ship's hull, and the other side connected to each signalling circuit through a fuse 93, and a ballast resistance 94 to the recording milliammeters 95 and 96. From the milliammeters the circuits continue through the conductors 90 and 91 and signal cable M, shown in Fig. 1, and at the plow the signal cable is secured in any suitable manner to the plow structure, and the cable leads or conductors 90 and 91 are caused to enter their respective transmitting devices through suitable stuffing boxes 100 in the cover 46 of the transmitter casing. The conductor 90 or 91 of the signal circuit is connected, as shown in Figs. 5 and 6, to one end of the resistance element 74, and thence through the various sections of the resistance coils 74 to 77, to the rheostat segments 71 and 72 in the manner disclosed in Fig. 5. The return circuits are through the spring pressed rollers 69 and 70, rheostat arm 68, and thence to the casing 40, the circuit being completed through the water to the vessel V to which the battery 92 is grounded.

The pendulum 64 of each of the transmitting devices remains and swings at all times in a vertical plane and thus the movements of the pendulum under the influence of gravity, and the corresponding signals transmitted in response to movements of the rheostat arm 68 over the segments 71 and 72, accurately indicate the departure of the cable embedding device upwardly and downwardly from the horizontal. One of the transmitters screwed to the platform E shown in Fig. 2, for example, transmitter 36a, is disposed so that the vertical plane in which its pendulum swings is substantially parallel to the longitudinal axis of the embedding device F and thus there is transmitted to the vessel V signals which indicate the successive positions of the device F with reference to its longitudinal axis during the cable embedding operation. The other transmitter 36b is turned 90 degrees with respect to the transmitter 36a so that the vertical plane in which the pendulum of the transmitter 36b swings is substantially parallel to the transverse axis of the embedding device and thus there are transmitted to the vessel V signals which indicate the successive positions of the device F with reference to its transverse axis during the cable embedding operation. The signals thus obtained disclose the angular positions assumed by the cable embedding device as it travels along on the bed of the ocean, and the signals also indicate the rise and the fall of the embedded cable due to elevations and depressions in the ocean bed and also disclose the configuration of the bed.

The ballast resistances 94, Fig. 4, on board the vessel preferably are of the tubular type and are continuously variable from zero to 276 ohms, these resistances being provided to adjust the milliammeter deflection at the commencement of an operation and subsequently protecting the milliammeter in the event of a cable fault. The deflection adjustment should be made when the transmitter on the plow is in a known position, for instance, with the pendulum and arm 68 in the zero or mid-point position, to bring the milliammeter pointer to the corresponding mid-point scale position. Once set, the ballast resistance shound remain unchanged until the length of messenger cable M in the signal circuit is changed. In the specific circuit disclosed in Fig. 4 of the drawings, the resistance in each circuit between the ship's ground and the plow, including the resistance of the messenger cable but excluding the plow instrument, will be approximately 229 ohms. Since the messenger cable shown has a resistance of approximately 49 ohms per mile, there will be between 130 and 230 ohms in each of the ballast resistances, depending on the length of messenger cable in use.

The recording milliammeters are of a type well known in the art, and therefore are not described here in detail. The useful part of the chart on each recording milliammeter may be 3¾ inches wide, and is divided into 50 parts each representing 10 milliamperes of current. The divisions are progressively smaller from the zero-current end of the scale to the maximum-current end, but the departure from linearity is slight. Both indicator circuits have been so designed that the current will not fall below 20 milliamperes or rise above 480 milliamperes, unless a fault occurs in the messenger cable or elsewhere.

It is essential that the supply voltage 92 be maintained within a small margin on either side of 110 volts. The effect of a change of voltage on the milliammeter deflection varies with the deflection itself, and the apparatus has been so designed that the greatest effect occurs in lesser-used parts of the scale or where the degree of accuracy required is lowest.

In order to prevent fouling of the cable M by the plow or the cable C or towline T, buoy devices B are provided, as shown in Fig. 1, the buoy devices being connected to the cable at points so spaced from the cable laying device as to prevent fouling. Because of the enormous hydrostatic pressures encountered, it was found impracticable to build single large buoys which would withstand the pressures and yet retain a reasonable margin of buoyancy, and therefore as shown in Fig. 8 each buoy device comprises a plurality of small buoys 110 which may comprise hollow steel balls, and these buoys are enclosed in a container 111 of canvas or other suitable material, the stress on the container being carried by a rope 112 which surrounds and is sewn to the container 111. The rope 112 also provides a means for securing the buoy device to the messenger cable, as by stoppers 113 secured to the cable in the manner shown in the drawing. Even when relatively small balls 110 were used as buoys, nevertheless it was found that these balls were likely to collapse in the event of a dent made in them by adjacent balls, and therefore the individual buoys are separated by shock absorbing means 114 of felt or other suitable material. With the buoy device shown, eddy resistance and consequent vibrational stresses are reduced to a minimum and are not substantially greater than that encountered with a single ball.

The cable embedding device F may be lowered onto the bed of the ocean or other body of water by the lowering attachment 118, Fig. 3, and any suitable form of lowering line, such as shown in the aforesaid Lawton and Bloomer patent, No. 2,067,717, or the Lawton Reissue Patent No. 20,665 may be used. Because of the disposition of the center of gravity which is kept low in the device F and because of the substantial breadth of the device and the side plate members 120, Fig. 2, the device will not turn over even though canted through a large angle with respect to the horizontal, and if the device should be canted onto its side its configuration and its low center of gravity tend to cause it to return to its working position. The device is especially adapted for embedding a submarine cable and simultaneously determining the topography of the bed in which the cable is embedded, in deep water and at considerable distances from shore, and may be lowered into working position out at sea in such areas. The various mechanical elements of the apparatus disclosed preferably are made from material resistant to the corrosive action of salt water.

In the specific embodiment illustrated, the device F, on which the transmitting units 36a and 36b are mounted, is employed for embedding a submarine cable, but the invention is not limited to such a device since the transmitting apparatus disclosed can be used equally well with other devices which may be slid or otherwise caused to travel along on the bed of the ocean or other body of water for indicating at a remote point the angular positions assumed by the device as it travels along, and for obtaining a record of the successive positions of the device. Such a device may be used to determine the most desirable route for a cable to take, and may be employed for obtaining accurate charts of the topography of the bed in harbors and other places.

In the claims, the word "length" employed in connection with the submarine device that travels along on the bed of the ocean or other body of water, refers either to the longitudinal and/or transverse dimensions of the device depending upon whether the longitudinal inclination or the transverse inclination, or both, of the device are to be determined.

Many other and varied forms and uses will readily suggest themselves to those versed in the art without departing from the invention, and the invention is, therefore, not limited except as indicated by the scope of the appended claims.

I claim:

1. Submarine apparatus comprising a device of sufficient length to enable determination of the slope of the bed of the ocean or other body of water and means for causing the device to travel along on the said bed, said device having means operable under the water for transmitting signals corresponding to angular positions assumed by the device with respect to the horizontal as it travels along on said bed, and receiving means located at a distance from the transmitting means and responsive to said signals to indicate the angular positions of said device.

2. Submarine apparatus comprising a device of sufficient length to enable determination of the slope of the bed of the ocean or other body of water and means for causing the device to travel along on the said bed, said device having means operable under the water for transmitting signals respectively corresponding to the successive angular positions assumed by the device with respect to the horizontal as it travels along on said bed, and receiving means located at a distance from the transmitting means and responsive to said signals to indicate the successive angular positions of said device.

3. Submarine apparatus comprising a device for traveling along on the bed of the ocean or other body of water, said device being of sufficient length to enable determination of the slope of said bed, means including a vessel for towing said device along on said bed, said device having means operable under the water for transmitting an electric signal indicative of the angular position assumed at the instant by said device with respect to the horizontal as it travels along on said bed, receiving means on the vessel responsive to the signals transmitted, and a conductor extending between the vessel and device for interconnecting said transmitting and receiving means.

4. Submarine apparatus comprising a device of sufficient length to enable determination of the slope of the bed of the ocean or other body of water and means for causing the device to travel along on the said bed, said device having means for transmitting signals respectively corresponding to the angular positions assumed by the device with respect to the horizontal as it travels along on said bed, a casing surrounding said transmitting means and means for enabling the casing to withstand the hydrostatic pressure of the water and prevent the entrance of water to the transmitting means, a receiving station located at a distance from the transmitting means and responsive to said signals, and a signal circuit for interconnecting said transmitting means and receiving station.

5. Submarine apparatus comprising a device of sufficient length to enable determination of the slope of the bed of the ocean or other body of water and means for causing the device to travel along on the said bed, said device having a transmitter, a signal circuit operatively associated with the transmitter, a source of signal current for said circuit, said transmitter having means automatically movable by the motion of said device for varying the current in the signal circuit in accordance with the various angular positions assumed by the device as it travels along on said bed, a receiver located at a distance from the transmitter and operatively associated with said signal circuit, said receiver having means responsive to the varying signal current to indicate the various positions assumed by said device, means enclosing said transmitter and means for enabling the enclosing means to withstand the hydrostatic pressure of the water and prevent the entrance of water to the transmitter.

6. Submarine apparatus comprising a device of sufficient length to enable determination of the slope of the bed of the ocean or other body of water and means for causing the device to travel along on the said bed, said device having a transmitter, a signal circuit operatively associated with the transmitter, a source of signal current for said circuit, said transmitter comprising a pendulum automatically operable by the motion of said device and contact means controlled by said pendulum for varying the flow of current in the signal circuit in accordance with the various angular positions assumed by the device as it travels along on said bed, a receiver located at a distance from the transmitter and operatively associated with said signal circuit, said receiver having means responsive to the varying signal current to indicate the various positions assumed by said device, means enclosing said pendulum and contact means and means for enabling the enclosing means to withstand the hydrostatic pressure of the water and prevent the entrance of water to the pendulum and contact means.

7. Submarine apparatus comprising a device of sufficient length to enable determination of the slope of the bed of the ocean or other body of water and means for causing the device to travel along on the said bed, said device having a transmitter, a signal circuit operatively associated with the transmitter, a source of signal current for said circuit, said transmitter having means including a pendulum automatically operable by the motion of said device and means controlled by said pendulum for varying the flow of current in the signal circuit in accordance with the various angular positions assumed by the device as it travels along on said bed, a receiver located at a distance from the transmitter and operatively associated with said signal circuit, said receiver having means responsive to the varying signal current to indicate the various positions assumed by said device, a casing enclosing said pendulum and means for enabling said casing to withstand the hydrostatic pressure of the water, said last named means including a liquid insulating medium within the casing preventing the entrance of water therein and damping the movements of the pendulum.

8. A submarine cable laying device of sufficient length to enable determination of the slope of the bed of the ocean or other body of water, said device having supporting means for engaging and traveling along on the said bed, means for causing the device to travel along on said bed, means for simultaneously passing a cable through the device, and means including transmitting apparatus on said device for transmitting signals to a distant point indicative of the successive angular positions assumed by said device with respect to the horizontal as it travels along during the cable laying operation.

9. A submarine cable laying device of sufficient length to enable determination of the slope of the bed of the ocean or other body of water, said device having supporting means for engaging, and traveling along on the said bed, means including a vessel and a towline connected to said device for causing the device to travel along on said bed, means for simultaneously passing a cable through the device, and means on said device for transmitting to said vessel electrical signals each corresponding to the successive angular positions assumed by said device with respect to the horizontal as it travels along during the cable laying operation.

10. A submarine cable laying device having supporting means for engaging and traveling along on the bed of the body of water in which the cable is to lie, means including a towline connected to said device for causing the device to travel along on said bed, means for simultaneously passing a cable through the device, means on said device for transmitting electrical signals to indicate a condition of the device as it travels along during the cable laying operation, receiving means located at a point distant from said device and responsive to said signals, a conductor extending between the transmitting and receiving means, and buoy means connected to said conductor at a point intermediate the transmitting and receiving means to prevent fouling of the conductor by the cable and towline.

11. A submarine cable laying device having supporting means for engaging and traveling along on the bed of the body of water on which the cable is to lie, means including a towline connected to said device for causing the device to travel along on said bed, means for simultaneously passing a cable through the device, means on said device for transmitting electrical signals to indicate a condition of the device as it travels along during the cable laying operation, receiving means located at a point distant from said device and responsive to said signals, a conductor extending between the transmitting and receiving means, buoy means connected to said conductor and immersed in the water at a point so spaced from the cable laying device as to prevent fouling of the conductor by the cable and towline.

12. A submarine cable laying device having supporting means for engaging and traveling along on the bed of the body of water on which the cable is to lie, means including a towline connected to said device for causing the device to travel along on said bed, means for simultaneously passing a cable through the device, means on said device for transmitting electrical signals to indicate a condition of the device as it travels along during the cable laying operation, receiving means located at a point distant from said device and responsive to said signals, a conductor extending between the transmitting and receiving means, a buoy device connected to said conductor and immersed in the water at a point so spaced from the cable laying device as to prevent fouling of the conductor by the cable and towline, said buoy device comprising a plurality of adjacent individual buoys, a container for said buoys, and shock absorbing means intermediate the adjacent ones of said buoys.

CHESTER S. LAWTON.